United States Patent
Sohn et al.

(10) Patent No.: US 11,449,708 B2
(45) Date of Patent: Sep. 20, 2022

(54) METHOD OF IDENTIFICATION AND ANALYSIS FOR MATERIALS

(71) Applicant: Industry Academy Cooperation Foundation of Sejong University, Seoul (KR)

(72) Inventors: Kee-sun Sohn, Seoul (KR); Jin-woong Lee, Busan (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 199 days.

(21) Appl. No.: 16/705,890

(22) Filed: Dec. 6, 2019

(65) Prior Publication Data

US 2020/0184266 A1 Jun. 11, 2020

(30) Foreign Application Priority Data

Dec. 6, 2018 (KR) .................. 10-2018-0156028
Nov. 21, 2019 (KR) .................. 10-2019-0150069

(51) Int. Cl.
*G06K 9/62* (2022.01)
*G06N 3/04* (2006.01)

(52) U.S. Cl.
CPC .......... *G06K 9/6256* (2013.01); *G06N 3/0418* (2013.01)

(58) Field of Classification Search
None
See application file for complete search history.

(56) References Cited

FOREIGN PATENT DOCUMENTS

KR 10-2018-0073819 A 7/2018

OTHER PUBLICATIONS

Felipe Oviedo et al., "Fast classification of small X-ray diffraction datasets using data augmentation and deep neural networks", arxiv. org., Cornell University Library, 201 Olin Library Cornell University Ithaca, NY 14852, Nov. 20, 2018, XP081052689.
Ronan Le Bras et al., "A Computational Challenge Problem in Materials Discovery: Synthetic Problem Generator and Real-World Datasets", Proceedings of the Twenty-Eighth AAAI Conference on Artificial Intelligence, Jul. 27, 2014, XP055691766, Quebec City, Canada.

*Primary Examiner* — Leon Flores
(74) *Attorney, Agent, or Firm* — Novick, Kim & Lee, PLLC; Jae Youn Kim; Jihun Kim

(57) ABSTRACT

A method of identifying and analyzing materials includes selecting at least two elements, collecting data of a plurality of compounds analyzed to be producible by the at least two elements, preparing image or spectrum-type analysis data for each of the plurality of collected compounds, selecting binary or higher-order compounds from among the plurality of compounds to mix the selected compounds at a predetermined mixing ratio, and generating training data including resultant data obtained by combining and processing the image or spectrum-type analysis data according to the predetermined mixing ratio, performing machine learning using the training data, and identifying and/or analyzing image or spectrum-type analysis data obtained from an actual material, using a model obtained through the machine learning.

5 Claims, 11 Drawing Sheets

| type | number | group NO. |
|---|---|---|
| Corundum-Al2O3 (Al-O) | 74 | 0 |
| Spinel-defect (Al-O) | 9 | 1 |
| AlFeO3 (Al-O) | 3 | 2 |
| Ga2O3 (Al-O) | 2 | 3 |
| gamma (Al-O) | 2 | 4 |
| AgsbO3 (Al-O) | 1 | 5 |
| Cr2Mg4O4 (Al-O) | 1 | 6 |
| Fluorite-CaF2 (AL-O) | 1 | 7 |
| NaCl (AL-O) | 1 | 8 |
| Rh2S3 (AL-O) | 1 | 9 |
| UNCATEGORIZED(AL-O)(23560) | 1 | 10 |
| UNCATEGORIZED(AL-O)(40200) | 1 | 11 |
| Fluorite-CaF2, Li2O (Li-O) | 14 | 12 |
| Li2O (Li-O) | 1 | 13 |
| UNCATEGORIZED(Li-O)(24143) | 1 | 14 |
| UNCATEGORIZED(Li-O)(108886) | 1 | 15 |
| NaCl (Sr-O) | 7 | 16 |
| CaC2 (Sr-O) | 6 | 17 |
| LiAlO2-gamma (Li-Al-O) | 7 | 18 |
| Li5AlO4 (Li-Al-O) | 2 | 19 |
| spinel-LiFe5O8 (Li-Al-O) | 2 | 20 |
| Spinel-defect (Li-Al-O) | 1 | 21 |
| Delafossite-NaCrS2 (Li-Al-O) | 1 | 22 |
| LiFeO2-alpha (Li-Al-O) | 1 | 23 |
| Li5GaO4-alpha (Li-Al-O) | 1 | 24 |
| SrAl2O4 (Sr-Al-O) | 5 | 25 |
| M-type-ferrite CaAl12O19 (Sr-Al-O) | 4 | 26 |
| Sr4Al14O25 (Sr-Al-O) | 3 | 27 |
| BaMgSiO4 (Sr-Al-O) | 3 | 28 |
| BaAl2O4 (Sr-Al-O) | 2 | 29 |
| Ca9Al6O18 (Sr-Al-O) | 2 | 30 |
| UNCATEGORIZED CaAl4O7 (Sr-Al-O) | 2 | 31 |
| (Sr-Al-O)(57177.200671) | 2 | 32 |
| CaAlB3O7 (Sr-Al-O) | 1 | 33 |
| Sr.5Al11O17 (Sr-Al-O) | 1 | 34 |
| Sr10Ga6O19 (Sr-Al-O) | 1 | 35 |
| UNCATEGORIZED (Sr-Al-O) | 1 | 36 |
| Sr2LiAlO4 | 1 | 37 |

FIG. 2

| RANGE | | DATA NUMBER (RANGE) | TERNARY NUMBER | TERNARY REPETITION NUMBER | SUM |
|---|---|---|---|---|---|
| 86 AT LEAST | 97 AT MOST | 49 | 21 | 32 | 32928 |
| 76 AT LEAST | 85 AT MOST | 617 | 21 | 16 | 207312 |
| 10 AT LEAST | 75 AT MOST | 2205 | 21 | 8 | 370440 |
| 3 AT LEAST | 9 AT MOST | 5565 | 21 | 1 | 116865 |
| | | | | | 727545 |

| RANGE | DATA NUMBER (RANGE) | BINARY NUMBER | BINARY REPETITION NUMBER | SUM |
|---|---|---|---|---|
| NO RANGE FOR BINARY | 703 | 9 | 11 | 69597 |

| RANGE | DATA NUMBER (RANGE) | SINGLE NUMBER | SINGLE REPETITION NUMBER | SUM |
|---|---|---|---|---|
| NO RANGE FOR SINGLE | 38 | 1 | 100 | 3800 |
| | | | | TOTAL SUM |
| | | | | 800942 |

FIG. 7

METHOD OF IDENTIFICATION AND ANALYSIS FOR MATERIALS

BACKGROUND OF THE INVENTION

1. Field of the Invention

The present invention relates to a method for efficiently identifying and analyzing elements, phases, and compositions included in various materials such as inorganic materials, organic materials, and the like.

2. Description of the Related Art

One of situations that most frequently occur when discovering materials based on a powder analysis technology is related to identification and quantization of unknown polyphase compounds.

In general, a variety of analysis equipment such as XRD, XPS, EDS, and the like is used to analyze elements, phases, and components included in materials. However, it frequently requires a significantly long time for those having expertise and experience in the relevant technical field to achieve a correct analysis result using the analysis equipment.

A variety of analysis software has been developed to reduce the material analysis time. For example, there is analysis software using an algorithm based on a crystallographic theory, but this analysis software cannot provide sufficient accuracy. Furthermore, analysis software using a machine learning method is not significantly different from conventional rule-based analysis software with respect to an analysis result since training data sets are small and feature engineering based on theoretical knowledge is excessively used.

In addition, it can be said that almost none of pieces of conventional analysis software can accurately derive information about a material being manufactured in real time in a manufacturing process line containing the corresponding material.

PRIOR ART DOCUMENT

Patent Document

Korean Patent Application Laid-open Publication No. 10-2018-0073819

SUMMARY OF THE INVENTION

The present invention provides a method for identifying and analyzing elements, phases, content or the like of various materials such as inorganic materials, organic materials, and the like accurately within a short time.

According to an embodiment of the invention, there is provided a method of identifying and analyzing materials, the method including: (a) selecting at least two elements; (b) collecting data of a plurality of compounds analyzed to be producible by the at least two elements; (c) preparing image or spectrum-type analysis data for each of the plurality of collected compounds; (d) selecting binary or higher-order compounds from among the plurality of compounds to mix the selected compounds at a predetermined mixing ratio, and generating training data including resultant data obtained by combining and processing the image or spectrum-type analysis data according to the predetermined mixing ratio; (e) performing machine learning using the training data; and (f) identifying and/or analyzing image or spectrum-type analysis data obtained from an actual material, using a model obtained through the machine learning.

When selecting the at least two elements, the number of selected elements is preferably 2 to 10, more preferably 3 to 8.

In the method, chemical analysis and material analysis data that has been achieved up to the present time may be used as the data of the plurality of compounds. For example, in the case of inorganic materials, the compounds registered in ICSD may be used.

In the method, the preparing the image or spectrum-type analysis data for each of the plurality of collected compounds may include using an actually analyzed result or using material information about each of the compounds to calculate a corresponding analysis image or spectrum using a program.

In the method, for example, when a ternary compound is present with regard to compound A, compound B, and compound C, the predetermined mixing ratio may be set such that the content of the ternary compound is changed in increments of 0.5% by mass % so as to process image or spectrum data accordingly. However, the predetermined mixing ratio is not necessarily limited thereto, and may be adjusted according to circumstances related to characteristics of a material to be analyzed and provided data.

In the method, the image or spectrum-type analysis data is not particularly limited if the image or spectrum-type analysis data enables machine learning, and for example, XRD data, XPS data, IR data, or a transmission electron microscope diffraction pattern may be used.

In the method, various algorithms may be applied to the machine learning, and for example, the machine learning may be performed through a convolutional neural network (CNN).

BRIEF DESCRIPTION OF THE DRAWINGS

FIG. 2 illustrates compounds used in an embodiment of the invention;

FIG. 7 illustrates a specific condition for deriving mixing XRD data;

DETAILED DESCRIPTION OF THE EXEMPLARY EMBODIMENTS

Hereinafter, configurations and operations of embodiments of the invention will be described in detail with reference to the accompanying drawings. Detailed descriptions of well-known relevant functions or configurations will be omitted in order not to unnecessarily obscure the focus of the invention. Furthermore, when it is mentioned that a certain part "includes" or "comprises" certain elements, the part may further include other elements, unless otherwise specified.

Figure 1:
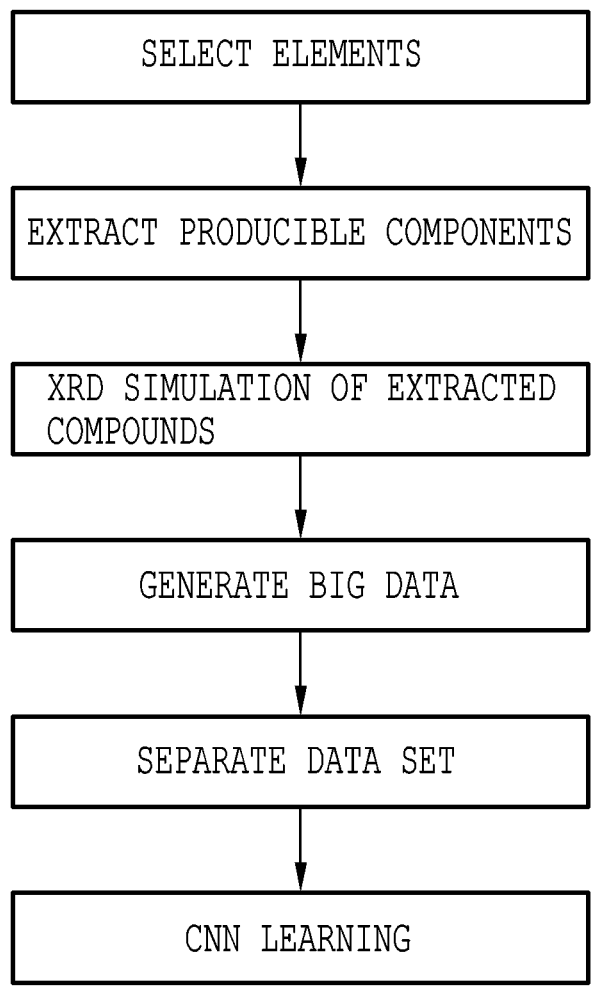
FIG. 1 is a flowchart illustrating a method of identifying a material according to an embodiment of the invention.

FIG. 1 is a flowchart illustrating a method of identifying a material according to an embodiment of the invention. As illustrated in FIG. 1, the method of identifying a material according to an embodiment of the invention includes: selecting elements constituting a material to be analyzed; extracting information about compounds producible by the selected elements; simulating XRD data for each of the extracted compounds; generating big data for machine learning by combining the simulated XRD data at a predetermined ratio; and performing machine learning through a CNN architecture.

Selection of Elements and Collection of Compound Data

For an embodiment of the invention, strontium (Sr), aluminum (Al), lithium (Li), and oxygen (O), which are typical components of an inorganic luminescent material, were selected as the elements included in the material to be analyzed.

Next, as a result of checking information about compounds including the above four elements through Inorganic Crystal Structure Data (ICSD), a total of 174 compounds were found, and five compounds among the found compounds were incorrect and were thus excluded. Although not included in the 2018 version of the ICSD, $Sr_2LiAlO_4$, which is a recently discovered quaternary compound and is regarded as an excellent light luminescent material for an LED, was added.

Through this process, information about a total of 170 compounds including strontium (Sr), aluminum (Al), lithium (Li), and oxygen (O) was extracted, and the extracted inorganic compounds are shown in FIG. 2.

Although an inorganic material was selected as the material to be analyzed and the ICSD was used in an embodiment of the invention, it would be obvious that other types of data may be used for other types of materials.

XRD Data Simulation for Analyzing Compounds

Since various analysis methods may be used to analyze the compounds described above, it is necessary to select an analysis method to be applied in analyzing the compounds and to acquire related data. Various data such as XRD data, XPS data, IR data, and the like may be used to analyze a material. For an embodiment of the invention, the XRD data, which is typically used for analysis for identifying phases of inorganic materials, was selected as analysis data for identifying a material.

In cases when there is XRD data for the 170 compounds, the XRD data may be used. However, for an embodiment of the invention, XRD data was prepared using a simulation method so as to achieve sufficient effects for machine learning even if there is no sufficient XRD data.

Figure 3:
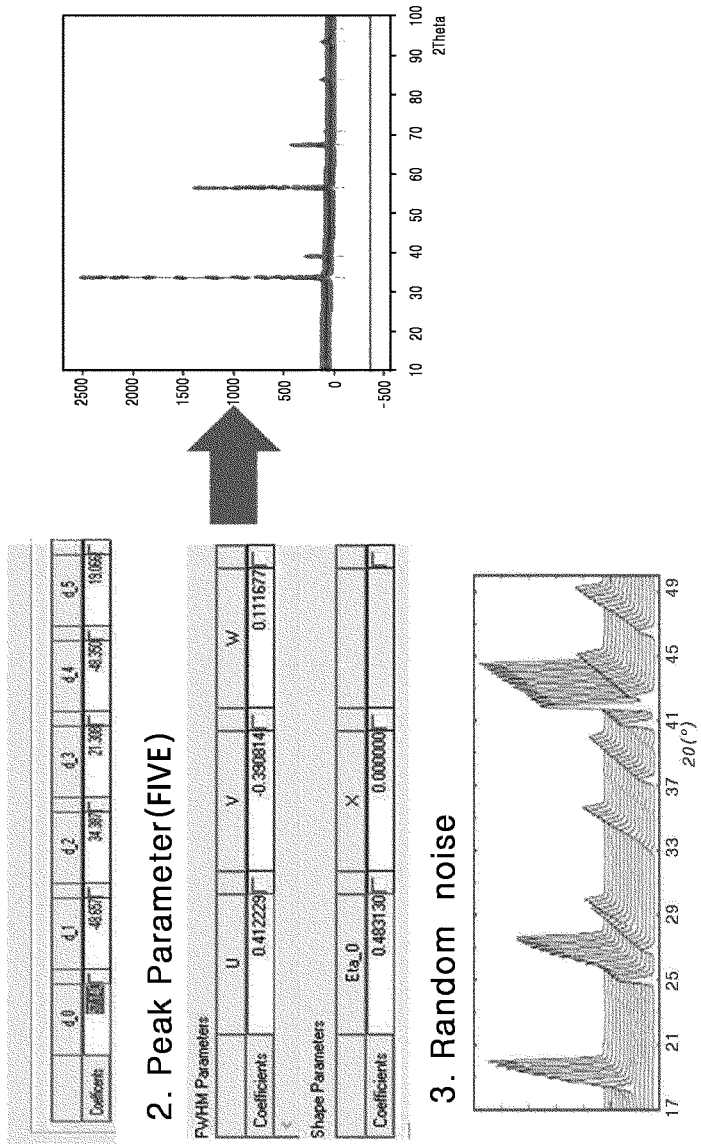
FIG. 3 is a diagram illustrating an operation of calculating and deriving XRD data of a specific compound using XRD configuration parameters from ICSD crystal structure data according to an embodiment of the invention.

FIG. 3 illustrates a process of simulating XRD data of a specific compound from ICSD crystal structure data.

In an embodiment of the invention, simulated XRD pattern data which is very similar to actual data was derived by selecting a total of six random parameters for a background simulation, using a total of five random parameters for a peak shape simulation, and assigning random noise data. Here, a lattice constant was randomly changed when deriving an XRD pattern from ICSD crystal information so as to derive a larger number of XRD patterns.

The simulated XRD pattern was obtained using, as fixed parameters, a structural factor, thermal factor, multiplicity, Lorentz and polarization factor, absorption, and preferred orientation obtained from the ICSD and also using adjustable parameters such as a peak profile (Caglioti and mixing parameter), background, and white noise.

In detail, the multiplicity was obtained from symmetry data included in the ICSD, polarization correction was applied to XRD for general experiment by using a Bragg-Brentano geometry with a graphite monochromator for an incident beam, and the preferred orientation was regarded as not being present. Furthermore, parameter values which commonly appear in a laboratory-scale X-ray diffractometer were referred to so as to randomly assign adjustable parameters.

Figure 4:
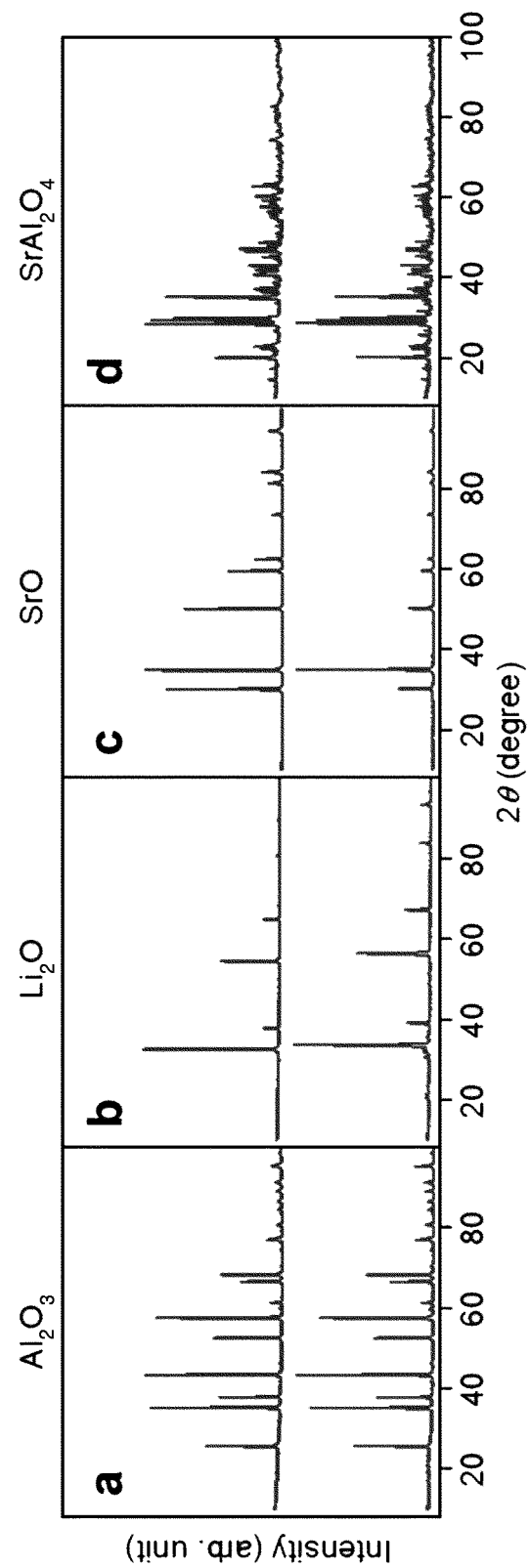
FIG. 4 is a graph illustrating a result of comparison between actually analyzed XRD patterns of $Al_2O_3$, $Li_2O$, $SrO$, and $SrAl_2O_4$ which are inorganic compounds including components to be analyzed and XRD patterns simulated through the above-mentioned method.

FIG. 4 is a graph illustrating a result of comparison between actually analyzed XRD patterns of $Al_2O_3$, $Li_2O$, SrO, and $SrAl_2O_4$ which are inorganic compounds including components to be analyzed and XRD patterns simulated through the above-mentioned method. In FIG. 4, the upper patterns (green) indicate an analysis result achieved through an actual experiment, and the lower patterns (brown) indicate XRD patterns simulated through the above-mentioned method. As illustrated in FIG. 4, the simulated XRD patterns and the actual XRD patterns were so similar that it was difficult to find a difference therebetween. Therefore, the XRD patterns simulated according to an embodiment of the invention are considered to be applicable to training data for machine learning, and this applicability is also confirmed by a result indicating that an actual material is correctly identified using a model established through machine learning using the simulated XRD patterns.

Through the above-mentioned process, various simulated XRD pattern for a total of 170 compounds.

Creation of Training Data Set

Figure 5:
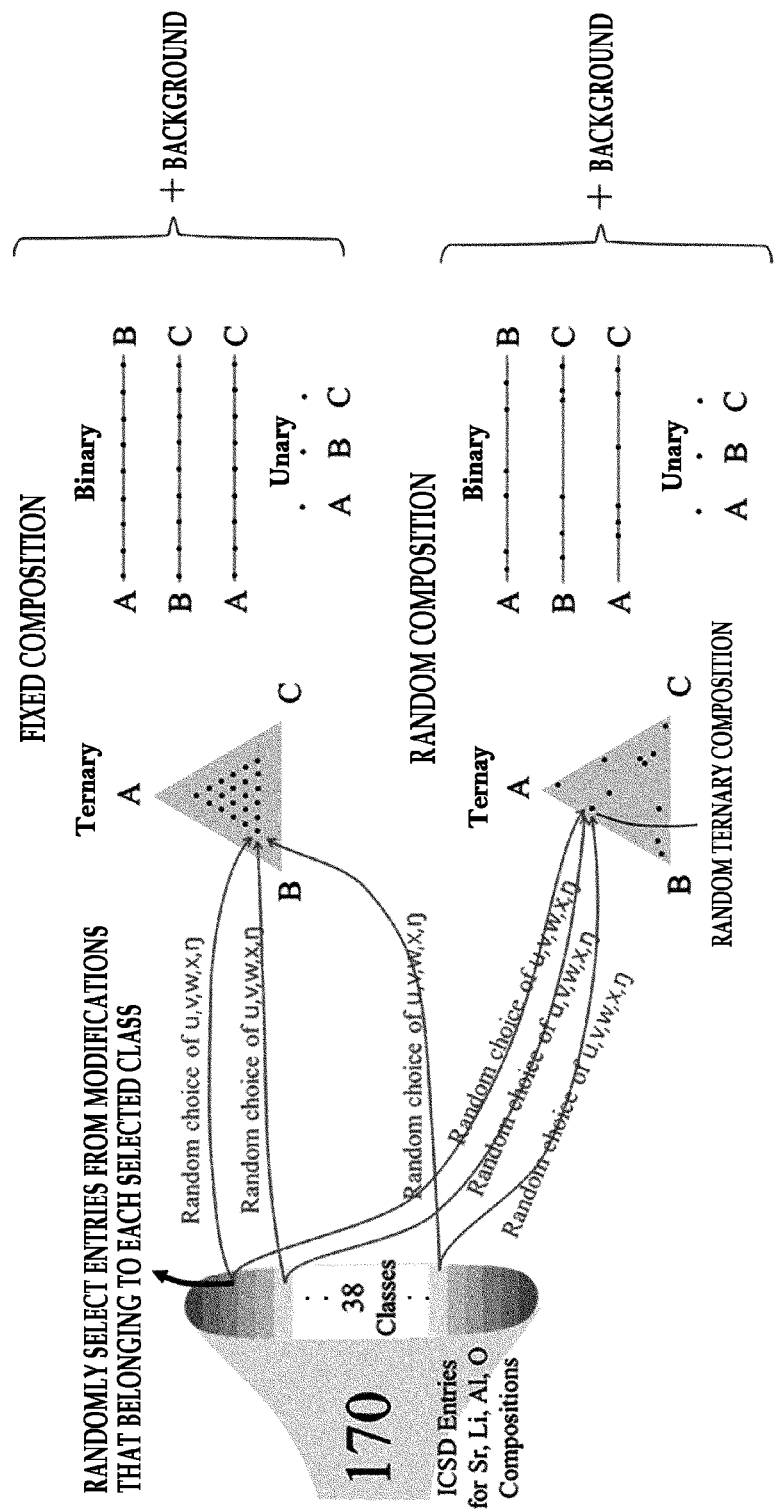
FIG. 5 illustrates an operation of deriving mixing data of each compound.
Figure 6:
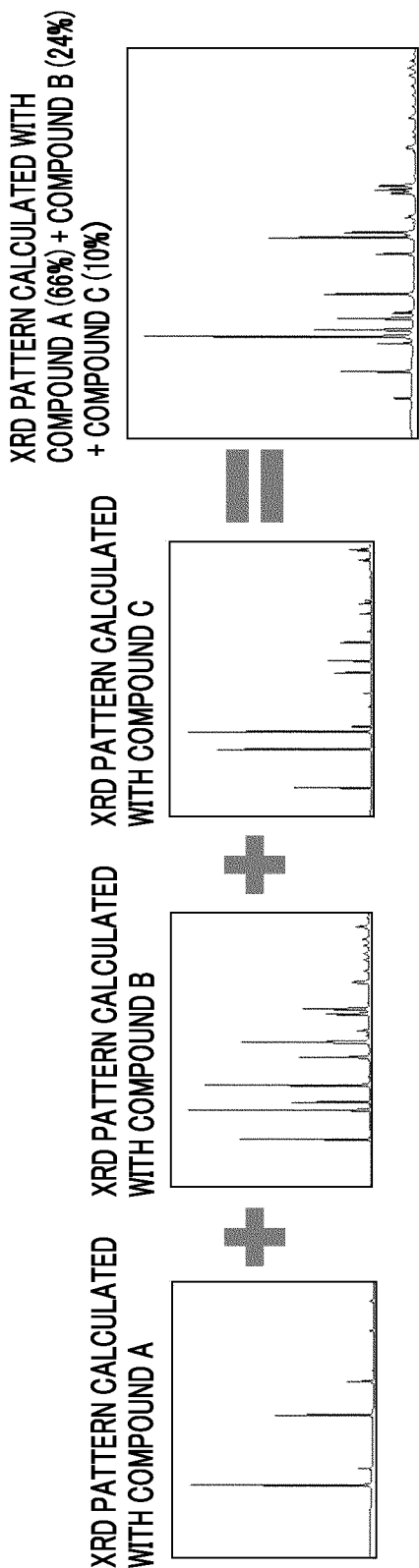
FIG. 6 illustrates an operation of processing XRD data according to the mixing ratio derived in FIG. 5.

FIG. 5 illustrates a process of deriving mixing data of each compound, FIG. 6 illustrates processing of XRD data according to a mixing ratio derived in FIG. 5, and FIG. 7 illustrates a specific condition for deriving mixing data.

As illustrated in FIG. 5, compounds having various components and mixing ratios were derived through composition selection and mixing ratio assignment for unary, binary, and ternary mixtures using compound A, compound B, and compound C.

The binary and ternary mixtures were produced on the basis of a combination including 38 classes rather than 170 classes based on the group illustrated in FIG. 2. Next, one of 170 modifications was randomly assigned to each component each time when selecting a class. For example, when $Al_2O_3$ was selected as a component of a mixture of interest, one of 74 modifications was randomly assigned to $Al_2O_3$. In this manner, 74 modifications were allowed to appear at least once for $Al_2O_3$. With regard to different mixtures of $_{38}C_3 \times 21 + _{38}C_2 \times 9 + _{38}C_1$ (183,521), the ternary mixture has 21 fixed compositions, and the binary mixture has nine fixed compositions. That is, although average quadruple repetition may be brought about for each mixture, repetitive selection was adopted only for some mixtures. Thus, the same mixture (e.g., same component and same fraction) could be hardly found from all data sets. If data is not prepared in this manner, each of 38 classes has the same opportunity to be selected, which may cause a problem of significantly decreasing the possibility that each phase of $Al_2O_3$ having 74 modified phases will be selected in comparison with $Li_2O_2$ having no modified phase.

When a mixing ratio is derived through the above-mentioned process, the XRD pattern of a mixture is derived using the method illustrated in FIG. 6. As illustrated in FIG. 6, the XRD pattern of a mixture was derived by adding, according to the mixing ratio of a mixture, the XRD pattern simulated with the compound A, the XRD pattern simulated with the compound B, and the XRD pattern simulated with the compound C.

A peak profile was allowed to be randomly selected each time two or three compounds were selected from 170 entries to configure a binary or ternary mixture combination so that the same XRD pattern of a mixture was not present among a total of 800,942 XRD patterns. A specific condition used during this process is illustrated in FIG. 7. Here, all of binary or ternary mixture combinations configured with entries that belong to the same class were excluded. Furthermore, an arbitrarily selected background and white noise were applied to each mixture.

Furthermore, derived XRD patterns were randomly divided into a data set for training (600,942 patterns), a data set for validity test (100,000 patterns), and a test data set (100,000 patterns).

In addition, on the condition that there is no random composition selection and repetitive selection so that there is no data similarity, a data set reduced compared to the above-mentioned method was additionally prepared, and the number of mixtures of this reduced data set was reduced to $_{38}C_3 \times 21 + _{38}C_2 \times 9 + _{38}C_1$ (183,521).

Three types of data sets were prepared as described above. 21 number of ternary mixtures of the compound A, compound B, and compound C and nine number of binary mixtures thereof are divided at equal intervals as illustrated in the upper portion of FIG. 5, and with regard to mixtures having large ICSD numbers among the materials illustrated in FIG. 2, 800,942 number of XRD pattern data repeatedly generated according to the condition illustrated in FIG. 7 is referred to as "Dataset_800k_org".

21 number of ternary mixtures of the compound A, compound B, and compound C and nine number of binary mixtures thereof are divided randomly as illustrated in the lower portion of FIG. 5, and with regard to mixtures having large ICSD numbers among the materials illustrated in FIG. 2, 800,942 number of XRD pattern data repeatedly generated according to the condition illustrated in FIG. 7 is referred to as "Dataset_800k_Rand".

21 number of ternary mixtures of the compound A, compound B, and compound C and nine number of binary mixtures thereof are divided randomly, and 183,521 number of XRD pattern data generated without repetition is referred to as "Dataset_180k_Rand".

CNN-Applied Deep Learning

In an embodiment of the invention, a data set size is larger, and polyphase XRD patterns are handled, and thus machine learning was performed by applying CNN which is suitable for analyzing such data and patterns.

Figure 8:
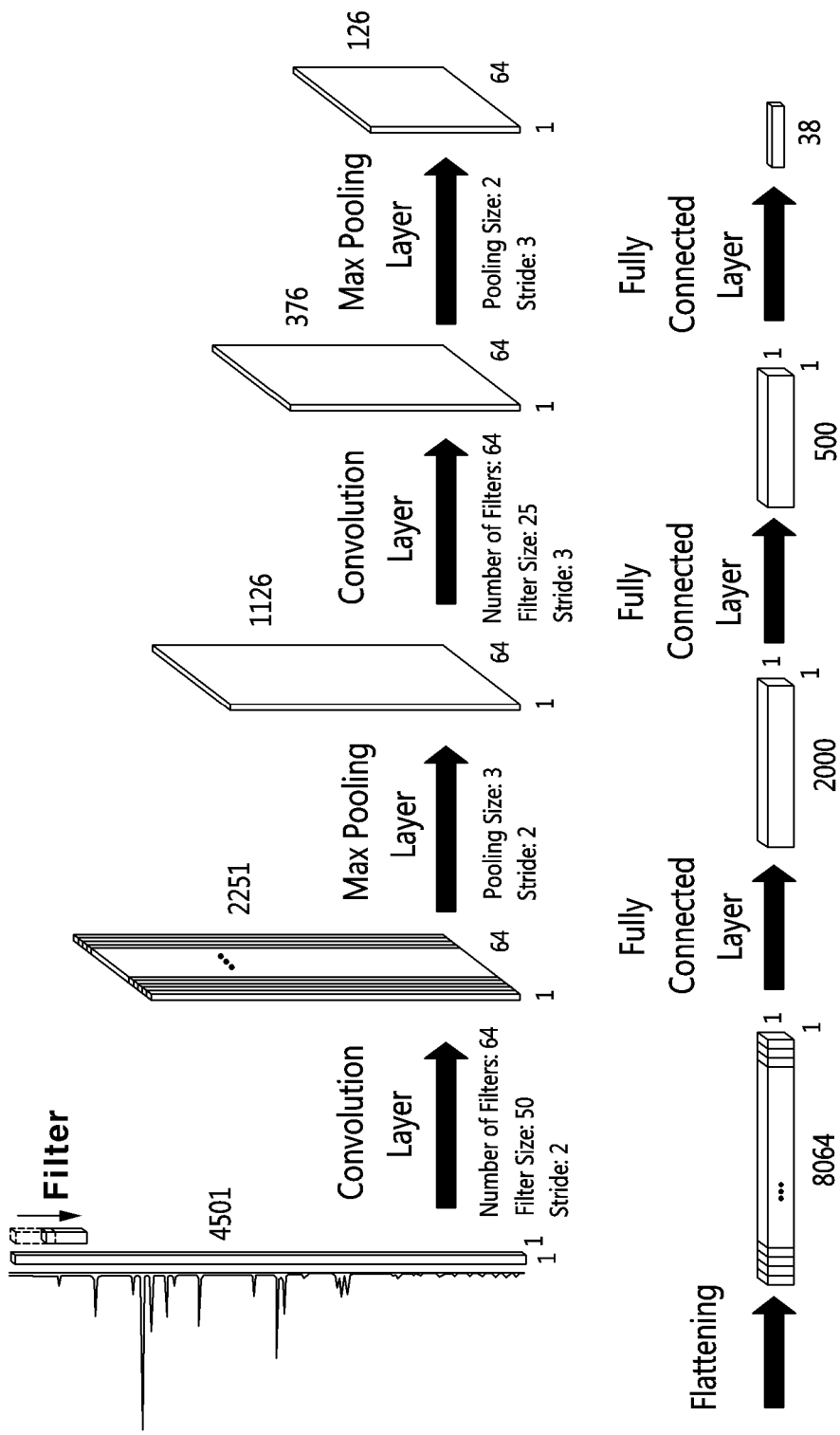
FIG. 8 illustrates a first CNN architecture used for deep learning in an embodiment of the invention ('a' is CNN2, 'b' is CNN3)
Figure 9:
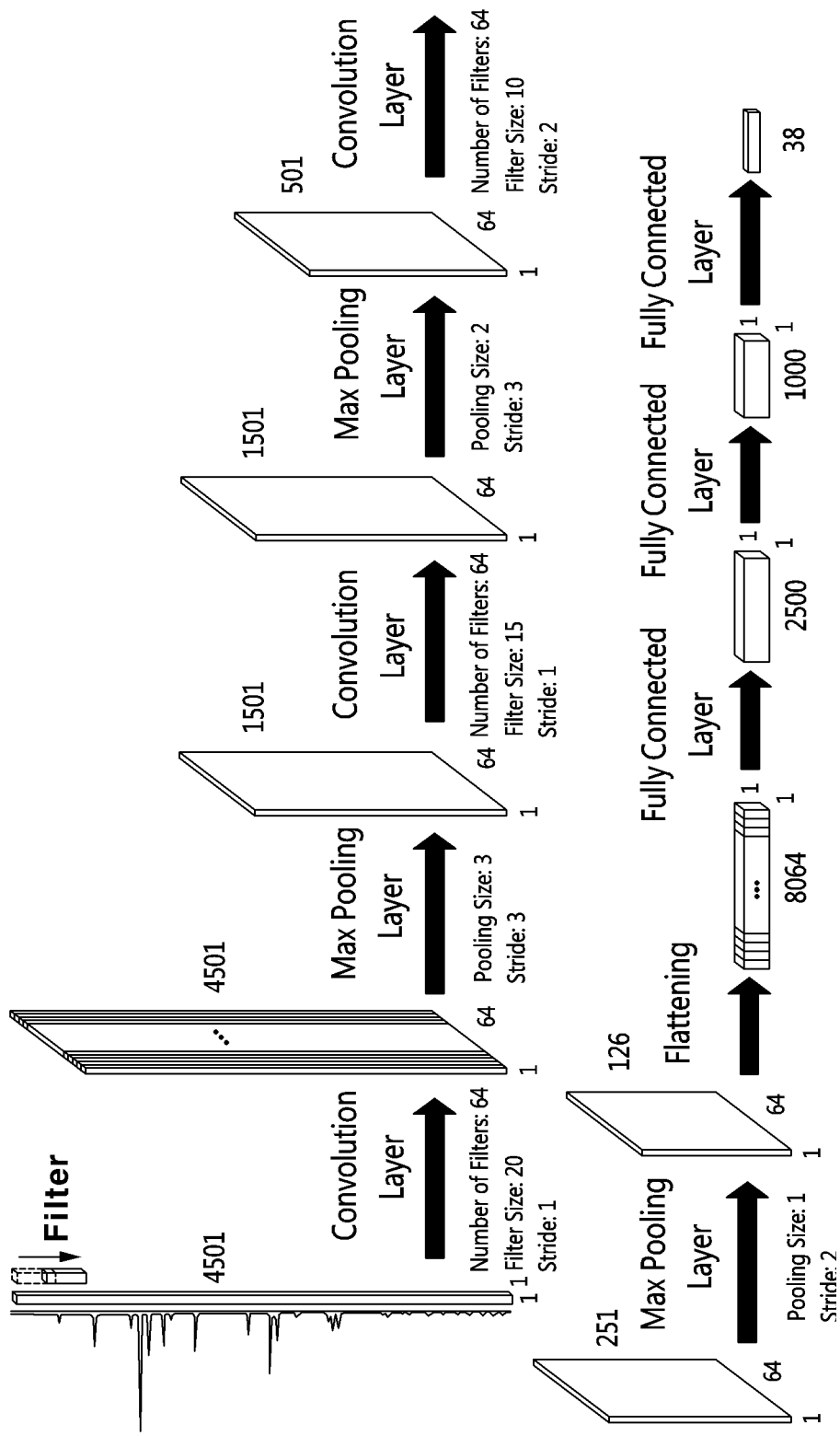
FIG. 9 illustrates a second CNN architectures used for deep learning in an embodiment of the invention.

FIGS. 8 and 9 illustrate two types of CNN architectures used for deep learning in an embodiment of the invention.

As illustrated in FIGS. 8 and 9, CNN architectures include multiple convolutions layers, a pooling layer, and three fully connected layers which are continuously connected.

In detail, the architecture having two convolution layers as illustrated in FIG. 8 is referred to as "CNN_2", and the architecture having three convolution layers as illustrated in FIG. 9 is referred to as "CNN_3". The two architectures have a configuration of a filter number, kernel size, pooling size, and stride as illustrated in FIGS. 8 and 9.

Meanwhile, as illustrated in FIG. 8, an embodiment of the invention adopted a configuration in which the stride is wider than the pooling size of one of convolution layers, and this configuration provided significantly faster convergence compared to conventional pooling. Meanwhile, as a result of carrying out a test using strides which are the same as the pooling sizes of CNN2 and CNN3, the convergence was relatively slow, but accuracy was substantially the same.

Furthermore, a rectified linear unit (ReLU) was adopted as an activation function for the convolution layer and a linear function for the fully connected layer, and dropout was implemented only for the fully connected layer. A final activation function for the fully connected layer was a sigmoid function, and a cost (or loss) function therefor was a cross entropy function. An input was a 4501×1 vector, and an output was a 38×1 vector. Furthermore, an Adam optimizer was used. An execution speed for all epochs for identifying phases was fixed to 0.001.

A prediction model was derived using a training data set and the CNN architectures described above.

Meanwhile, the CNN architectures applied in an embodiment of the invention may be variously modified, and the invention is not limited to the architectures proposed in the present embodiment. Furthermore, the CNN is not necessarily used, and thus, for example, a recurrent neural network (RNN) may also be used. In particular, a generative adversarial network (GAN) technology may also be applied to compensate for a difference between an XRD pattern derived through simulation and an actual XRD pattern.

Result of Phase Identification Using CNN Prediction Model

A test was carried out to determine whether phase identification is possible using a prediction model derived as a result of learning performed through the CNN2 and CNN3 architectures using the above-mentioned training data sets.

(1) Dataset_800k_org

Figure 10:
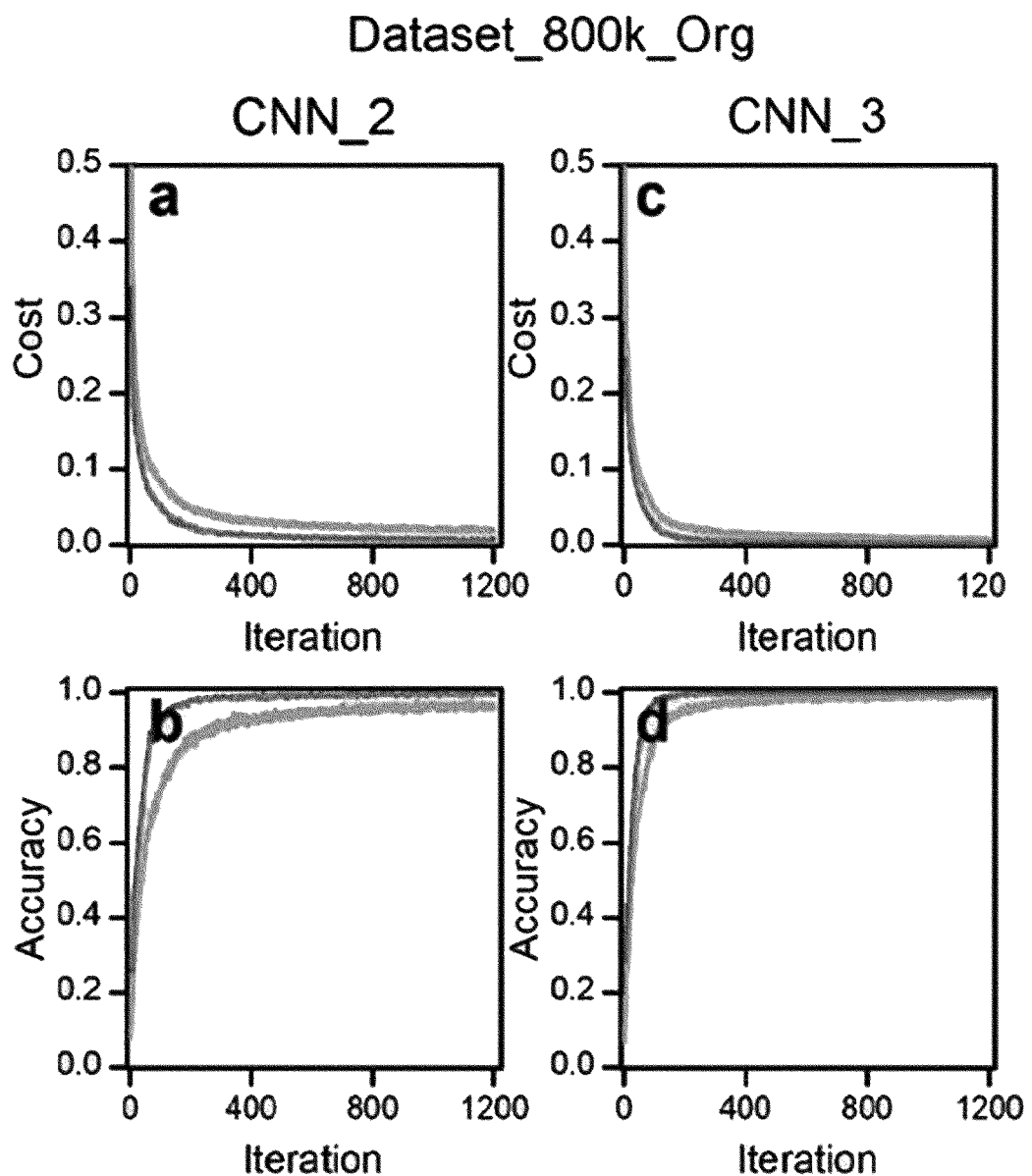
FIG. 10 illustrates a learning cost and accuracy when "Dataset_800k_org" is used.

FIG. 10 illustrates a learning cost and accuracy when the "Dataset_800k_org" is used. As recognized from FIG. 9, both the CNN_2 architecture and the CNN3 architecture provided almost 100% accuracy as a result of validity test, and validity verification costs for the CNN2 and CNN3 architectures were reduced to 0.007 and 0.0018 respectively.

100,000 number of simulated XRD patterns, which do not overlap with the training data sets, were prepared in order to test the CNN2 and CNN3 architectures trained using the "Dataset_800k_org", and ternary compounds $Li_2O$—$SrO$—$Al_2O_3$ and $SrAl_2O_4$—$SrO$—$Al_2O_3$ were dry-mixed at various fractions to prepare 50 mixture samples, and an actual XRD pattern was obtained and used in a phase identification test.

Following table 1 shows a result of carrying out a test using the above-mentioned two test data sets.

[Table 1]

As shown in above Table 1, the simulated test data set exhibited substantially ideal test accuracy for both the CNN2 and CNN3 architectures. Furthermore, as a result of carrying out a test using the $Li_2O$—$SrO$—$Al_2O_3$ data set, the data set exhibited 100% accuracy for both the CNN2 and CNN3 architectures.

Meanwhile, the test accuracy was slightly decreased as a result of carrying out a test using the $SrAl_2O_4$—$SrO$—$Al_2O_3$ data set. It was confirmed that this result was caused by a certain amount of impurities contained in $SrAl_2O_4$(SAO) powder used as a mixed raw material, indicating that a slightly erroneous prediction result was not an error of a CNN model.

It may be recognized from the test results that the method according to an embodiment of the invention may provide very high accuracy of identifying phases included in a multi-component material in which various materials are mixed.

(2) Phase Identification Based on Dataset_800k_rand/Dataset_180k_rand

Unlike the above-mentioned data sets, the data sets "Dataset_800k_rand" and "Dataset_180k_rand" employ a random-based method when configuring binary and ternary mixtures. These data sets are for comparing influences due to a difference between methods of blending when generating mixture data to prepare training data sets.

Figure 11:
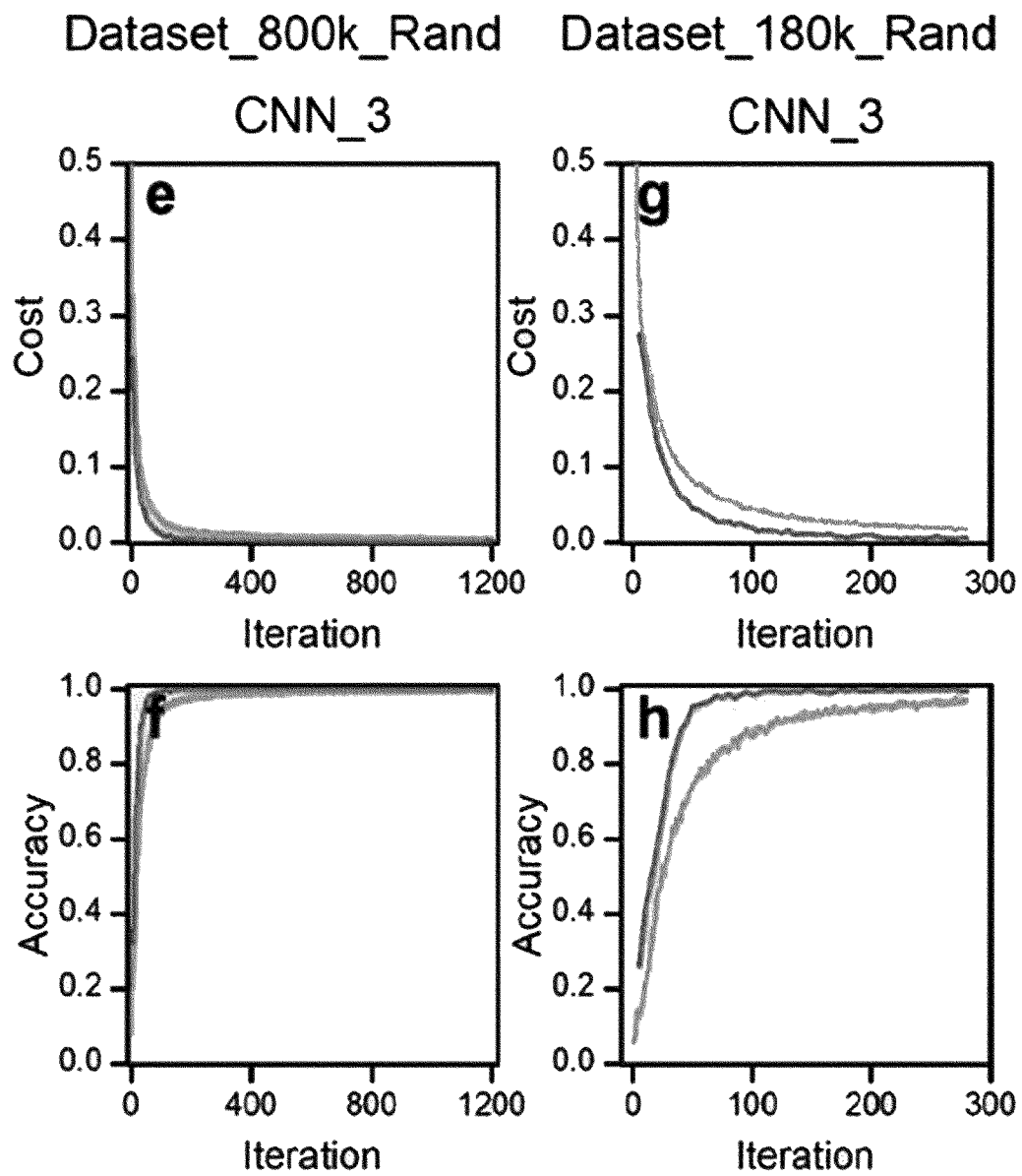
FIG. 11 illustrates a learning cost and accuracy when "Dataset_800k_rand" and "Dataset_180k_rand" are used.

As illustrated in FIG. 11, the achieved cost and accuracy were substantially the same as those achieved by performing CNN using the Dataset_800k_org.

Following table 2 shows a result of carrying out a test using the above test data sets.

[Table 2]

As shown in Table 2, the simulated test data set and the actual $Li_2O$—SrO—$Al_2O_3$ data set exhibited almost 100% accuracy when trained with the "Dataset_800k_rand". Meanwhile, when trained with the "Dataset_180k_rand", both the simulated test data set and the actual test data set exhibit slightly decreased test accuracy. This result is considered to be caused by a relatively small size of the training data set.

It may be recognized from the above results that there is almost no influence due to a difference between methods of blending mixtures when preparing training data sets, and there occurs a slight difference in accuracy depending on a data set size.

According to the invention, a component system including arbitrary elements is configured, and analysis data of all of known compounds producible by this system is used to process image or spectrum data by setting, in advance, a mixing ratio of all of the compounds in order to perform machine learning with a training data set, and then identification and/or analysis of an actual material is performed through a prediction model obtained as a result of the machine learning, and thus an accurate analysis result may be derived within a short time. For example, when a fitting result obtained in the invention is used as XRD data in a steel production line, real-time phase analysis is possible, thereby making it possible to check whether a fault occurs.

Furthermore, according to a material identification and/or analysis method of the invention, phase analysis and phase fraction analysis of an actual material in which various components are mixed may be performed more accurately in comparison with conventional theory-based software methods.

What is claimed is:

1. A method of identifying and analyzing materials, the method comprising:
    (a) selecting at least two elements;
    (b) collecting data of a plurality of compounds analyzed to be producible by the at least two elements;
    (c) preparing image or spectrum-type analysis data for each of the plurality of compounds;
    (d) selecting binary or higher-order compounds from among the plurality of compounds to mix the selected compounds at a predetermined mixing ratio, and generating training data comprising resultant data obtained by combining and processing the image or spectrum-type analysis data according to the predetermined mixing ratio;
    (e) performing machine learning using the training data; and
    (f) identifying and/or analyzing image or spectrum-type analysis data obtained from an actual material, using a model obtained through the machine learning,
    wherein the step (f) includes identifying phases of a mixture comprising two or more compounds and analyzing a phase fraction of each phase of the mixture.

2. The method according to claim 1, wherein chemical analysis and material analysis data analyzed in advance is used as an analysis data of the plurality of compounds.

3. The method according to claim 1, wherein said preparing the image or spectrum-type analysis data for each of the plurality of compounds comprises using an actually analyzed result or using material information about each of the plurality of compounds to simulate and obtain a corresponding analysis image or spectrum using a program.

4. The method according to claim 1, wherein the image or spectrum-type analysis data is XRD data, XPS data, IR data, or a transmission electron microscope diffraction pattern.

5. The method according to claim 1, wherein the machine learning is performed through a convolutional neural network (CNN).

* * * * *